US012766569B2

(12) United States Patent
Wu et al.

(10) Patent No.: US 12,766,569 B2
(45) Date of Patent: Oct. 20, 2026

(54) METHOD FOR CONTROLLING OPTICAL ELEMENT DRIVING MECHANISM

(71) Applicant: Actutek Corporation, Taoyuan City (TW)

(72) Inventors: Ya-Hsiu Wu, Taoyuan City (TW); Sin-Jhong Song, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 550 days.

(21) Appl. No.: 18/088,103

(22) Filed: Dec. 23, 2022

(65) Prior Publication Data

US 2023/0209201 A1 Jun. 29, 2023

Related U.S. Application Data

(60) Provisional application No. 63/266,034, filed on Dec. 27, 2021.

(51) Int. Cl.

| | |
|---|---|
| ***H04N 23/55*** | (2023.01) |
| ***B08B 7/02*** | (2006.01) |
| ***G02B 7/08*** | (2021.01) |
| ***G02B 26/08*** | (2006.01) |
| ***G02B 27/00*** | (2006.01) |
| ***H04N 23/68*** | (2023.01) |
| *G03B 5/00* | (2021.01) |
| *H04N 23/51* | (2023.01) |

(52) U.S. Cl.

CPC ................ *B08B 7/02* (2013.01); *G02B 26/08* (2013.01); *G02B 27/0006* (2013.01); *H04N 23/55* (2023.01); *G02B 7/08* (2013.01); *G03B 5/00* (2013.01); *G03B 2205/0015* (2013.01); *H04N 23/51* (2023.01); *H04N 23/687* (2023.01)

(58) Field of Classification Search

CPC .......... G02B 7/08; G02B 7/02; G02B 27/646; G03B 13/36; H04N 23/00; H04N 23/55

USPC ...... 359/554; 396/72, 73, 74, 75, 76, 77, 78, 396/79, 80, 81, 82, 83, 84, 85, 86, 87, 88

See application file for complete search history.

(56) References Cited

U.S. PATENT DOCUMENTS

| | | | | |
|---|---|---|---|---|
| 5,973,856 | A * | 10/1999 | Kanbara | G02B 7/102 359/694 |
| 6,225,614 | B1 * | 5/2001 | Ono | G02B 27/646 359/554 |
| 7,479,985 | B2 * | 1/2009 | Noguchi | G02B 27/646 348/208.11 |
| 10,394,044 | B2 * | 8/2019 | Hu | G02B 7/023 |
| 10,416,532 | B2 * | 9/2019 | Hu | F03G 7/065 |
| 10,506,086 | B2 * | 12/2019 | Hu | G02B 27/0012 |
| 10,613,295 | B2 * | 4/2020 | Chen | G02B 7/08 |
| 10,686,993 | B2 * | 6/2020 | Hu | H04N 23/55 |
| 10,761,403 | B2 * | 9/2020 | Wang | F03G 7/06143 |
| 11,067,822 | B2 * | 7/2021 | Hu | G02B 27/646 |
| 11,070,152 | B2 * | 7/2021 | Chan | G02B 7/09 |
| 11,226,542 | B2 * | 1/2022 | Wu | H04N 23/55 |

(Continued)

*Primary Examiner* — Ricky L Mack
*Assistant Examiner* — Elizabeth M Hall
(74) *Attorney, Agent, or Firm* — MUNCY, GEISSLER, OLDS & LOWE, P.C.

(57) ABSTRACT

A method for controlling an optical element driving mechanism, including controlling a driving assembly by a control assembly to drive a movable to move relative to a fixed portion. The movable portion is used for connecting to an optical element, and the movable portion is movable relative to the fixed portion.

17 Claims, 17 Drawing Sheets

(56) References Cited

U.S. PATENT DOCUMENTS

| | | | | |
|---|---|---|---|---|
| 11,333,847 | B2 * | 5/2022 | Hu | G03B 3/10 |
| 11,493,727 | B2 * | 11/2022 | Cheng | G02B 7/102 |
| 11,561,360 | B2 * | 1/2023 | Ryoo | H02N 2/142 |
| 11,650,482 | B2 * | 5/2023 | Wang | G03B 5/02 396/133 |
| 11,681,114 | B2 * | 6/2023 | Tang | G02B 7/02 359/823 |
| 11,726,390 | B2 * | 8/2023 | Weng | G03B 9/10 396/489 |
| 11,809,013 | B2 * | 11/2023 | Ryoo | G03B 13/36 |
| 11,809,015 | B2 * | 11/2023 | Chen | G02B 7/1821 |
| 11,815,736 | B2 * | 11/2023 | Hu | G02B 7/10 |
| 11,852,844 | B2 * | 12/2023 | Wu | G02B 27/646 |
| 11,921,307 | B2 * | 3/2024 | Wang | G02B 13/0075 |
| 11,947,180 | B2 * | 4/2024 | Hu | G02B 7/021 |
| 12,099,251 | B2 * | 9/2024 | Hu | G02B 26/08 |
| 12,225,276 | B2 * | 2/2025 | Hu | G02B 7/023 |
| 12,235,510 | B2 * | 2/2025 | Lin | G02B 7/023 |
| 2006/0158707 | A1 * | 7/2006 | Schwertner | G02B 7/02 359/15 |
| 2012/0093496 | A1 * | 4/2012 | Liu | G03B 11/043 396/439 |
| 2017/0123226 | A1 * | 5/2017 | Hu | G02B 27/646 |
| 2017/0285443 | A1 * | 10/2017 | Hu | F03G 7/0614 |
| 2017/0371127 | A1 * | 12/2017 | Murakami | G02B 7/04 |
| 2019/0230262 | A1 * | 7/2019 | Wang | G02B 3/12 |
| 2019/0369353 | A1 * | 12/2019 | Franklin | G02B 7/023 |
| 2020/0249421 | A1 * | 8/2020 | Hu | G03B 3/12 |
| 2021/0026103 | A1 * | 1/2021 | Wu | G02B 7/02 |
| 2021/0278627 | A1 * | 9/2021 | Chen | G02B 26/101 |
| 2022/0050261 | A1 * | 2/2022 | Chen | G02B 26/10 |
| 2022/0197050 | A1 * | 6/2022 | Wu | G02B 7/04 |
| 2022/0357556 | A1 * | 11/2022 | Hsiao | G02B 7/022 |
| 2023/0204972 | A1 * | 6/2023 | Wu | H04N 23/00 |
| 2023/0379586 | A1 * | 11/2023 | Chao | G06F 1/1686 |
| 2024/0411204 | A1 * | 12/2024 | Ke | G02B 27/646 |
| 2025/0004352 | A1 * | 1/2025 | Chao | G03B 5/00 |
| 2025/0028149 | A1 * | 1/2025 | Shen | H04N 23/685 |
| 2025/0093675 | A1 * | 3/2025 | Zhuang | G02B 27/646 |

* cited by examiner

METHOD FOR CONTROLLING OPTICAL ELEMENT DRIVING MECHANISM

CROSS REFERENCE TO RELATED APPLICATIONS

This application claims the benefit of U.S. Provisional Application No. 63/266,034, filed on Dec. 27, 2021, the entirety of which is incorporated by reference herein.

BACKGROUND OF THE INVENTION

Field of the Invention

The present disclosure relates to a method for controlling optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

A method for controlling an optical element driving mechanism is provided in some embodiments of the present disclosure, including controlling a driving assembly by a control assembly to drive a movable to move relative to a fixed portion. The movable portion is used for connecting to an optical element, and the movable portion is movable relative to the fixed portion.

In some embodiments, the method further includes limiting the movable portion to move relative to the fixed portion in a limited range by a stopping assembly, and controlling the driving assembly by the control assembly to drive the movable portion moving relative to the fixed portion in a controlled range, wherein the controlled range is smaller than the limited range.

In some embodiments, the method further includes outputting a first control signal to a first driving portion of the driving assembly by the control assembly, measuring the movement of the movable portion relative to the fixed portion by an external apparatus, recording the movement correlation of the movable portion relative to the fixed portion and the first control signal as a first predetermined information, and recording the first predetermined information in the control assembly.

In some embodiments, the method further includes sensing the movement of the movable portion relative to the fixed portion by a sensing assembly, providing a central module electrically connected to the control assembly, outputting a sensing signal to the central module by the sensing assembly, and analyzing and recording the sensing signal by the central module. The sensing signal is not outputted to the control assembly.

In some embodiments, the method further includes emitting or receiving light by an optical transceiver assembly, controlling the optical transceiver assembly by the central module based on the sensing signal to determine times of emitting or receiving light, outputting an inertia signal by an inertia sensing assembly, and recording influence of the inertia signal to the driving assembly as an inertia correction information.

In some embodiments, the method further includes recording the inertia correction information in the control assembly, and driving the movable portion to rotate relative to the fixed portion by the driving assembly relative to a rotational axis, and the rotational axis does not pass through a center of mass of the movable portion.

In some embodiments, the first control signal is periodic and includes a first front signal and a first rear signal in a period, wherein trends of the first front signal and the first rear signal are different. Durations of the first front signal and the first rear signal are different.

In some embodiments, wherein the first control has a first upper limit and a first lower limit, the first upper limit and the first lower limit have negative signs and different absolute values.

In some embodiments, the method further includes recording a first correction information in the control assembly, wherein the first correction information includes correction message in different steps.

In some embodiments, the method further includes choosing the first control signal and the corresponding correction message in the first correction information by the control assembly based on requirement, and outputting the first control signal and the correction message to the first driving portion at a same time.

In some embodiments, the method further includes adjusting the first control signal by the control assembly based on the inertia correction information to correct a position change of the movable portion caused by inertia, and the position change includes offsets and changes in friction coefficients.

In some embodiments, the first correction information only corresponds to the first front signal, without corresponds to the first rear signal, the first front signal is linear, and the first correction information is not linear.

In some embodiments, the method further includes outputting a second control signal by the control assembly to a second driving portion of the driving assembly, recording the movement correlation of the movable portion relative to the fixed portion and the second control signal as a second predetermined information, and recording the second predetermined information in the control assembly.

In some embodiments, the method further includes measuring movement of the movable portion relative to the fixed portion to get the second predetermined information. The first driving portion generates a first driving force, the second driving portion generates a second driving force, the first driving force drives the movable portion in a first mode, the second driving force drives the movable portion in a second mode, and the first mode and the second mode have an identical dimension and different directions.

In some embodiments, the method further includes recording the movement correlation of the movable portion relative to the fixed portion, the first control signal, and the second control signal as an integrated predetermined information, and recording the integrated predetermined information in the control assembly.

In some embodiments, the first control signal is periodic and has a first front signal, a first middle signal, and a first rear signal, and trends of the first front signal, the first middle signal, and the first rear signal are different, averages of the first front signal and the first rear signal are different.

In some embodiments, the average of the first front signal is greater than the average of the first rear signal, the second control signal is periodic and has a second front signal, a second middle signal, and a second rear signal, and trends of the first front signal, the first middle signal, and the first rear signal are different.

In some embodiments, the first front signal is linear, the first middle signal is non-linear, the first rear signal is linear, and the method further includes outputting the second control signal to the second driving portion when the first control signal is output to the first driving portion.

In some embodiments, the method further includes outputting the second front signal to the second driving portion when the first rear signal is output to the first driving portion, and determining the time of outputting the first control signal and the second control signal by the control assembly based on the integrated predetermined information.

In some embodiments, the average of the second front signal is greater than the average of the first rear signal, and the average of the second front signal is greater than the average of the first front signal.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
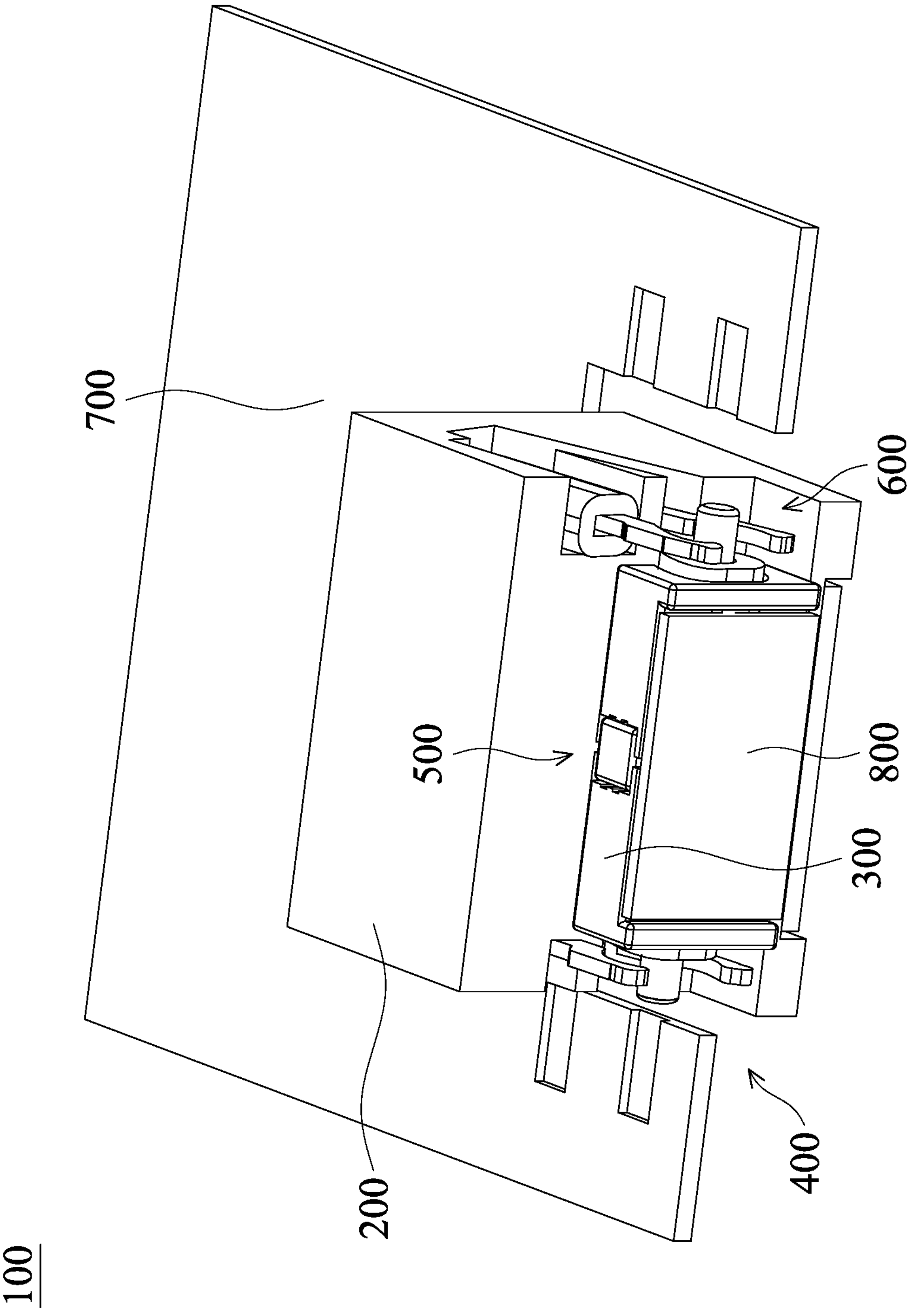
FIG. 1A, FIG. 1B, FIG. 1C, and FIG. 1E are schematic views of an optical element driving mechanism viewed from different directions in some embodiments of the present disclosure.
Figure 1B:
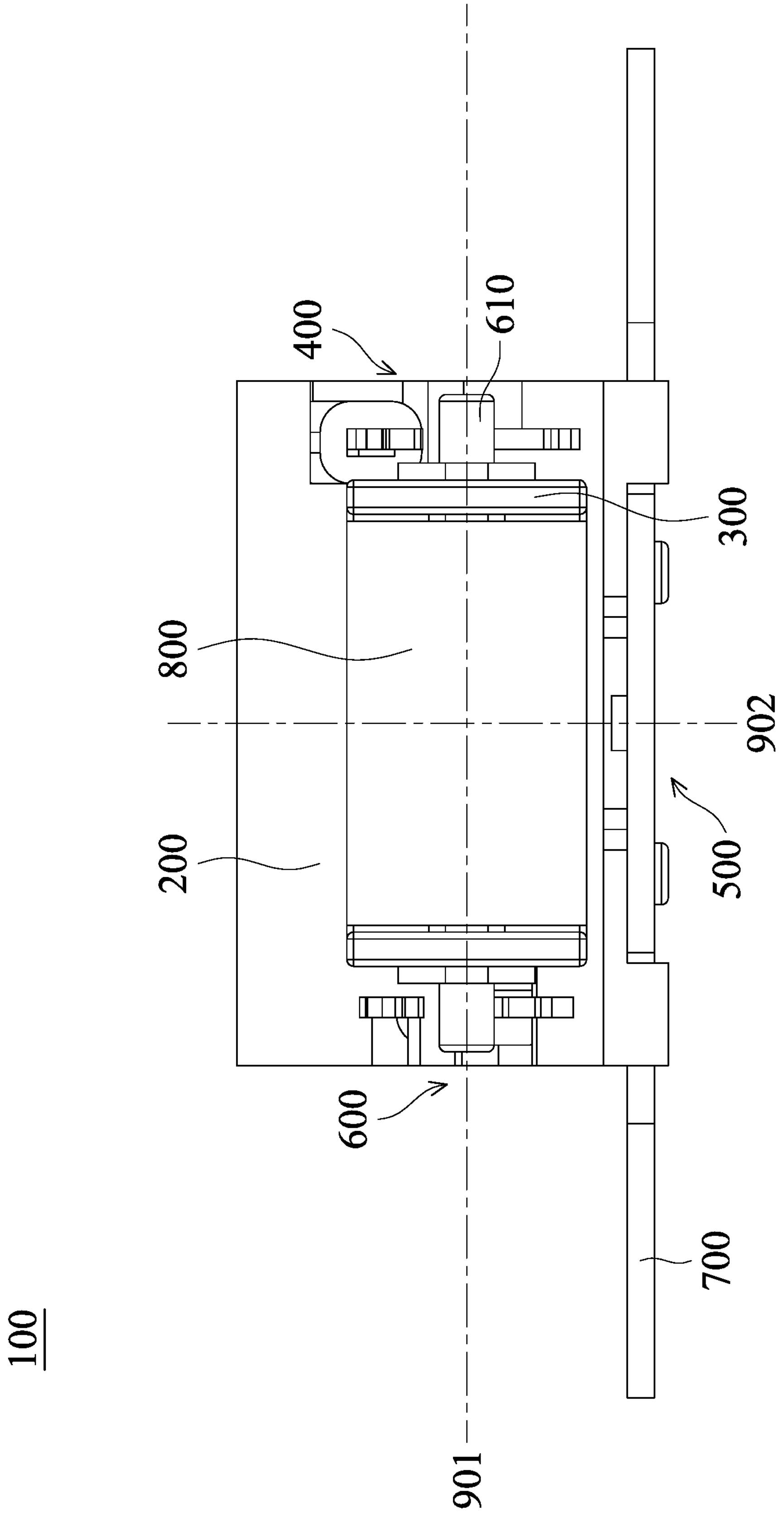
Figure 1C:
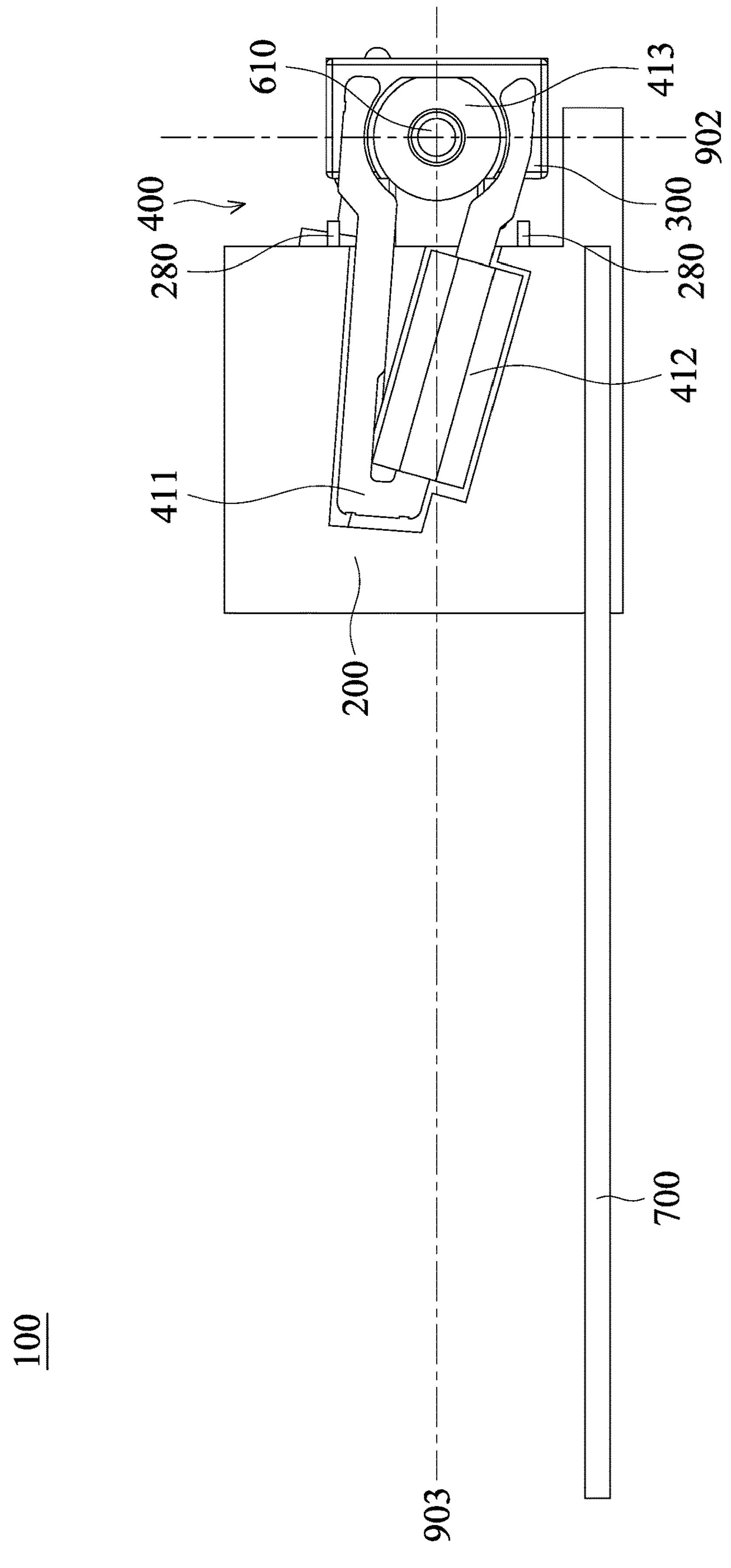

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1D:
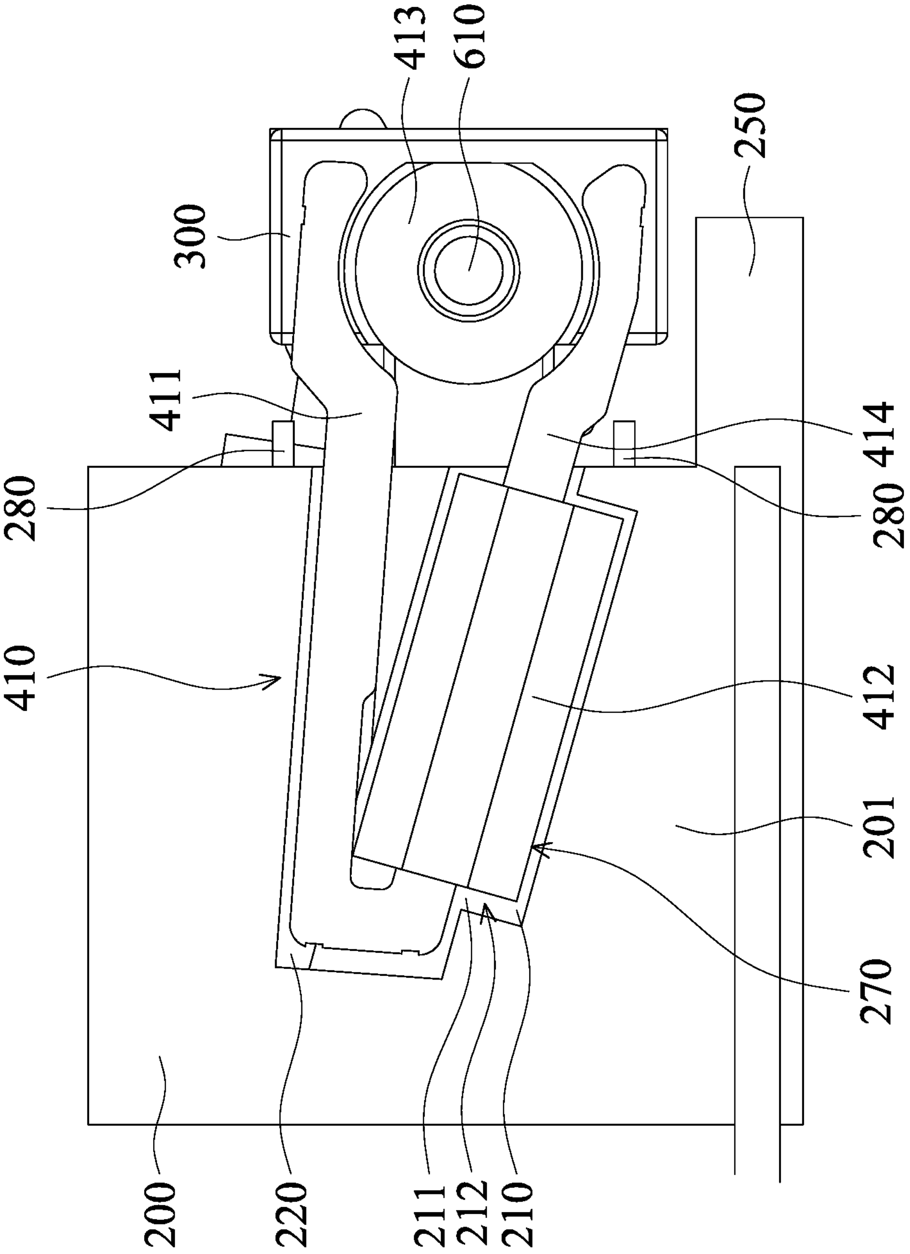
FIG. 1D is an enlarged view of FIG. 1C.
Figure 1E:
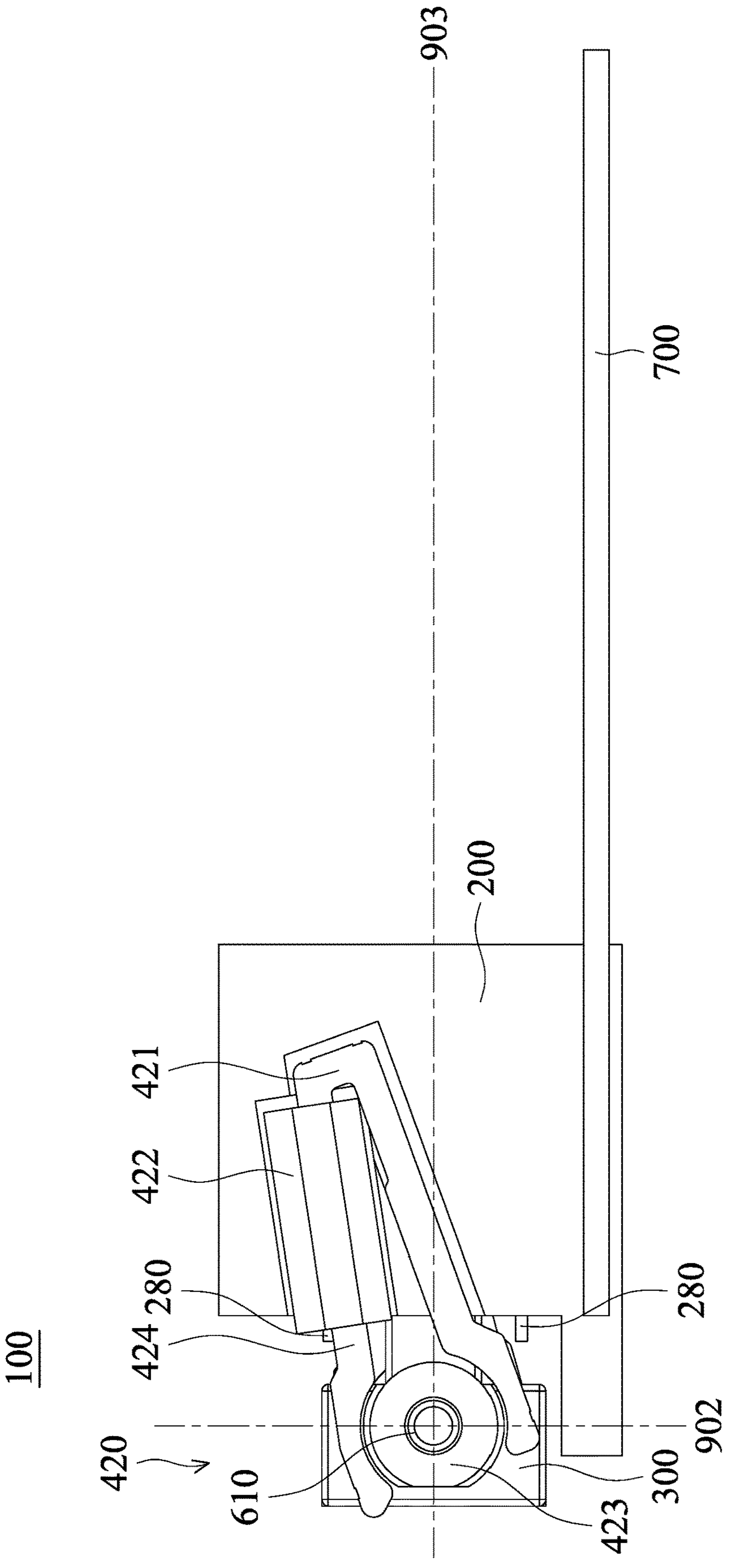

FIG. 1A, FIG. 1B, FIG. 1C, and FIG. 1E are schematic views of an optical element driving mechanism 100 viewed from different directions in some embodiments of the present disclosure. FIG. 1D is an enlarged view of FIG. 1C.

The optical element driving mechanism 100 may include a fixed portion 200, a movable portion 300, a driving assembly 400, a sensing assembly 500, a support assembly 600, a circuit assembly 700, and may be used for driving an optical element 800.

In some embodiments, the optical element 800 may be, for example, a lens, a mirror, a prism, a reflective polished surface, an optical coating, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure. Therefore, the type and function of the movable portion 300 may be different, and suitable movable portion 300 may be chosen based on actual requirement.

In some embodiments, the optical element 800 may be disposed on the movable portion 300, and the movable portion 300 is movable relative to the fixed portion 200, so the optical element 800 is movable relative to the fixed portion 200 to achieve functions like detection, scanning, or projection.

In some embodiments, the driving assembly 400 may include, for example, a first driving portion 410 (including a first magnetic permeable element 411, a first coil 412, and a first magnetic element 413) disposed on one side of the fixed portion 200 and the movable portion 300, and a second driving portion 420 (including a second magnetic permeable element 421, a second coil 422, and a second magnetic element 423) disposed on another side of the fixed portion 200 and the movable portion 300. The driving assembly 400 may be used for driving the optical element 800 to move relative to the fixed portion 200 in a first dimension, such as rotation taking an axis parallel to a first axis 901 as the rotational axis. The first axis 901 may pass through the intermediate element 610 and parallel to the intermediate element 610. Furthermore, the first axis 901 does not pass through the mass center of the movable portion 300.

In some embodiments, the first coil 412 may be disposed on the first magnetic permeable element 411, and the first magnetic element 413 may be disposed on the intermediate element 610 and may correspond to a first magnetic permeable portion 414 of the first magnetic permeable element 411. For example, the intermediate element 610 may pass through the first magnetic element 413, the rotational axis of the optical element 800 may pass through the intermediate element 610, and the first magnetic permeable portion 414 may be adjacent to the rotational axis. The first magnetic permeable portion 414 may have an arc-shaped surface surrounding the rotational axis.

In a direction that the first axis 901 extends, a distance between a center of the first magnetic permeable portion 414 and a center of the first magnetic element 413 is greater than 0. Moreover, when viewed along the first axis 901 or the second axis 902, the first magnetic element 413 and the first magnetic permeable portion 414 do not overlap each other. In the direction that the first axis 901 extends, the first connecting element 620 and the first magnetic element 413 may partially overlap each other to reduce the size in other directions, so miniaturization may be achieved.

In some embodiments, the second coil 422 may be disposed on the second magnetic permeable element 421, and the second magnetic element 423 may be disposed on the intermediate element 610 and may correspond to a second magnetic permeable portion 424 of the second magnetic permeable element 421. For example, the intermediate element 610 may pass through the second magnetic element 423, the rotational axis of the optical element 800 may pass through the intermediate element 610, and the second magnetic permeable portion 424 may be adjacent to the rotational axis. The second magnetic permeable portion 424 may have an arc-shaped surface surrounding the rotational axis.

In a direction that the first axis 901 extends, a distance between a center of the second magnetic permeable portion 424 and a center of the second magnetic element 423 is greater than 0. Moreover, when viewed along the first axis 901 or the second axis 902, the second magnetic element 423 and the second magnetic permeable portion 424 do not overlap each other. In the direction that the first axis 901 extends, the first connecting element 620 and the second magnetic element 423 may partially overlap each other to reduce the size in other directions, so miniaturization may be achieved.

In some embodiments, when viewed in the first direction, the first connecting element 620 and the second connecting element 630 may be between the first magnetic element 413 and the second magnetic element 423, and the third opening 310 does not overlap the first magnetic element 413 and the second magnetic element 423.

In some embodiments, in the direction that the first axis 901 extends, the centers of the first magnetic permeable element 411 and the second magnetic permeable element 421 do not overlap each other, or the entire first magnetic permeable element 411 and the entire second magnetic permeable element 421 do not overlap each other. Moreover, the winding axis of the first magnetic permeable element 411 and the winding axis of the first coil 412 are not parallel, and the winding axes are not parallel and perpendicular to the second axis 902.

Figure 2A:
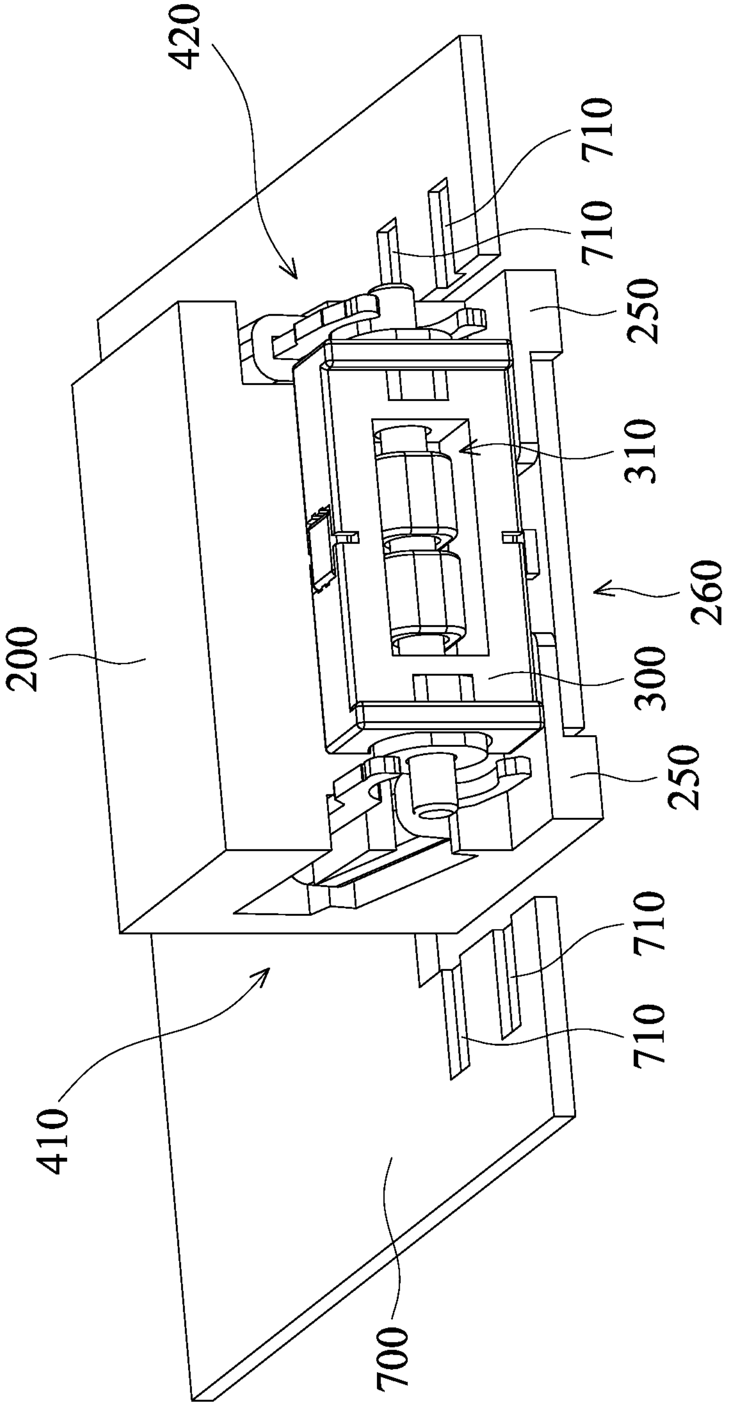
FIG. 2A and FIG. 2B are schematic views of the optical element driving mechanism, wherein the optical element is omitted.
Figure 2B:
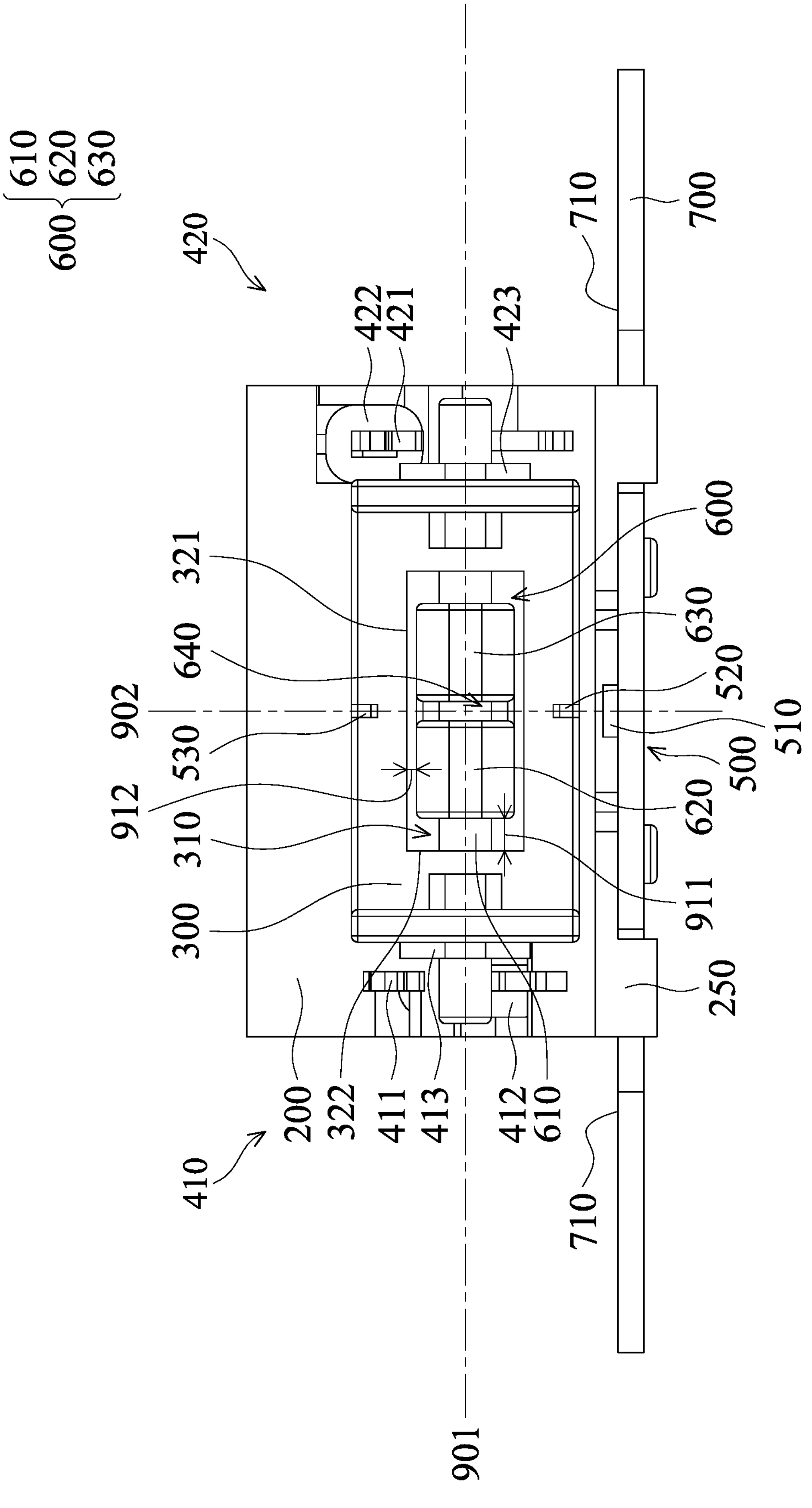
Figure 2C:
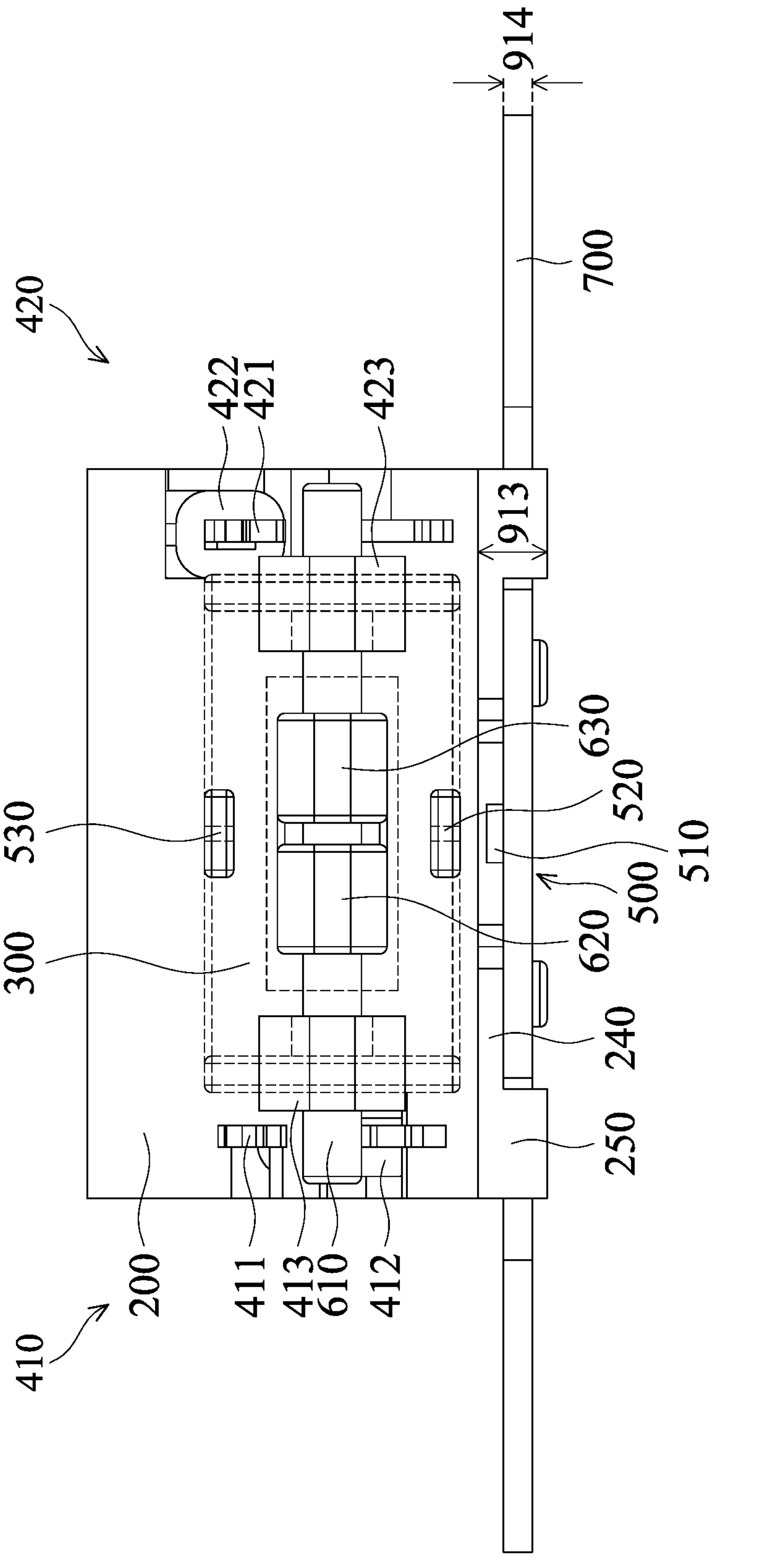
FIG. 2C and FIG. 2D are schematic views of some elements of the optical element driving mechanism.
Figure 2D:
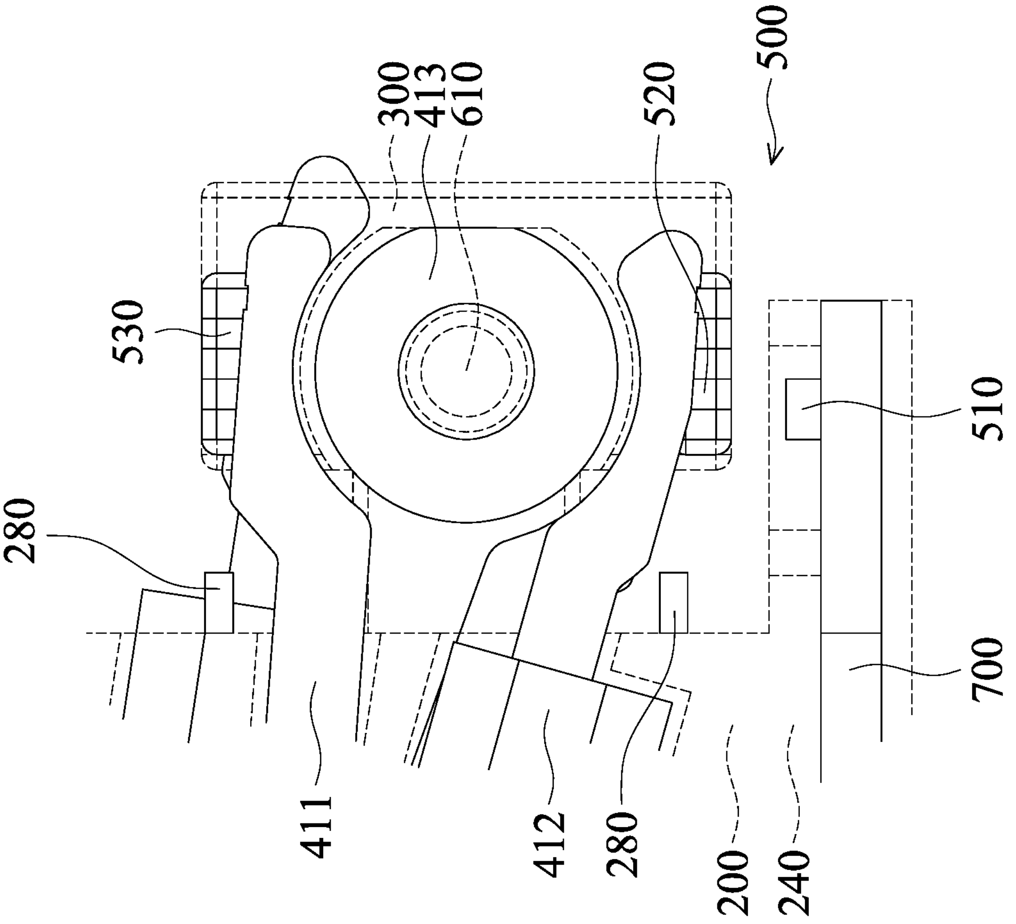

FIG. 2A and FIG. 2B are schematic views of the optical element driving mechanism 100, wherein the optical element 800 is omitted. FIG. 2C and FIG. 2D are schematic views of some elements of the optical element driving mechanism 100, wherein the elements behind the movable portion 300 are further shown.

In some embodiments, the sensing assembly 500 may be used for detecting the movement of the optical element 800 relative to the fixed portion 200, and may include a sensing element 510, a second reference element 520, and a balance element 530. In some embodiments, the sensing element 510 may correspond to the second reference element 520, such as overlap each other in the Z direction, and the sensing element 510 and the second reference element 520 may be respectively disposed on the fixed portion 200 and the movable portion 300, or their positions may be interchanged, depending on design requirement.

In some embodiments, the sensing element 510 may include a Hall sensor, a magnetoresistance effect sensor (MR sensor), a giant magnetoresistance effect sensor (GMR sensor), a tunneling magnetoresistance effect sensor (TMR sensor), or a fluxgate sensor. Therefore, the sensing element 510 may detect the magnetic field variation of the second reference element 520 to get the position of the movable portion 300 relative to the fixed portion 200 when the movable portion 300 moving relative to the fixed portion 200.

In some embodiments, the balance element 530 may include magnet, and the second reference element 520 and the balance element 530 may be disposed on opposite sides of the movable portion 300 to balance the weight on different sides of the movable portion 300. In some embodiments, the first connecting element 620 may be between the second reference element 520 and the balance element 530. In a direction that the second axis 902 extends, the second reference element 520 and the balance element 530 at least partially overlap each other. In some embodiments, the first coil 412 and the first magnetic element 413 may arrange in a direction (e.g., a direction that the first axis 901 extends) different from a direction that the second reference element 520 and the sensing element 510 arranged (e.g., the direction that the second axis 902 extends).

Figure 3A:
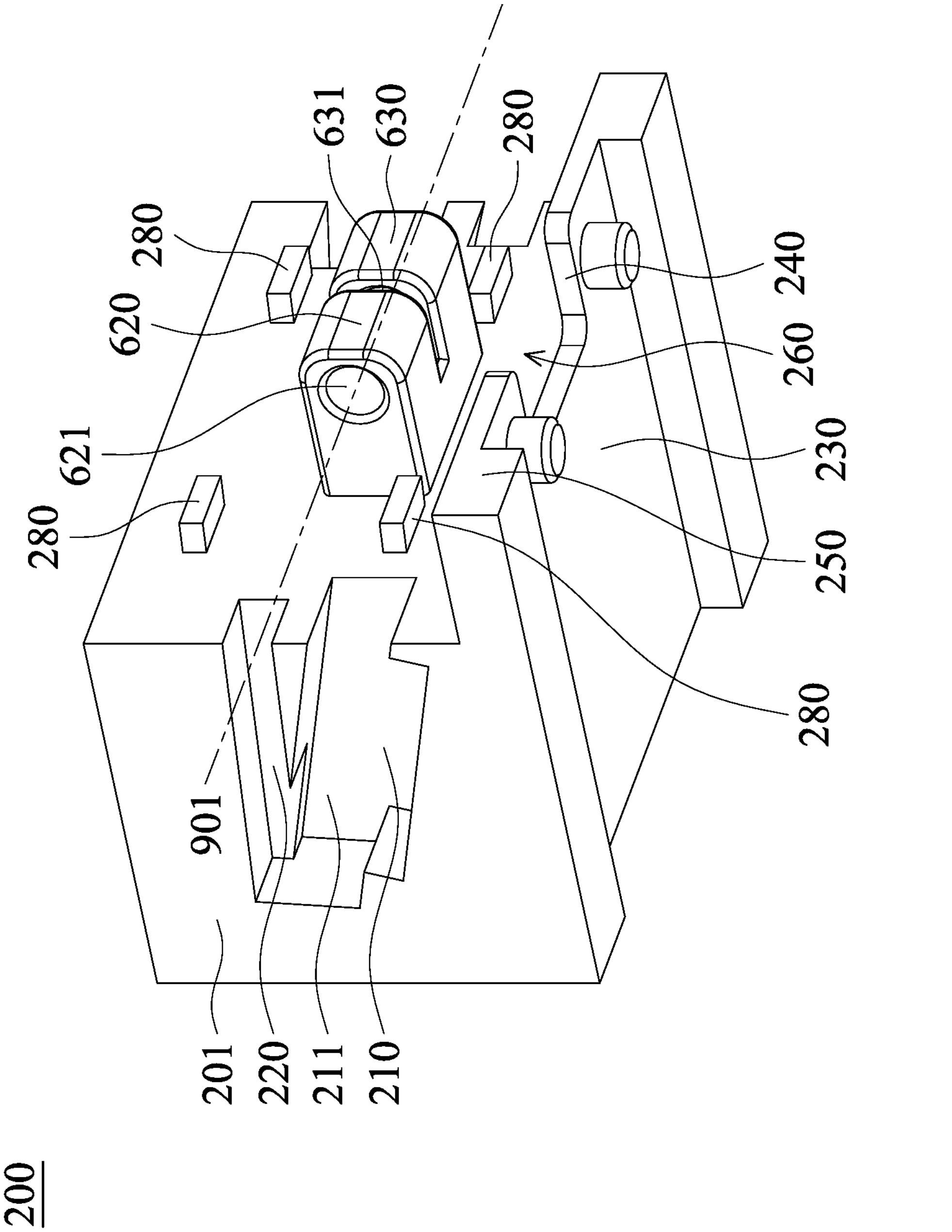
FIG. 3A and FIG. 3B are schematic views of the fixed portion.
Figure 3B:
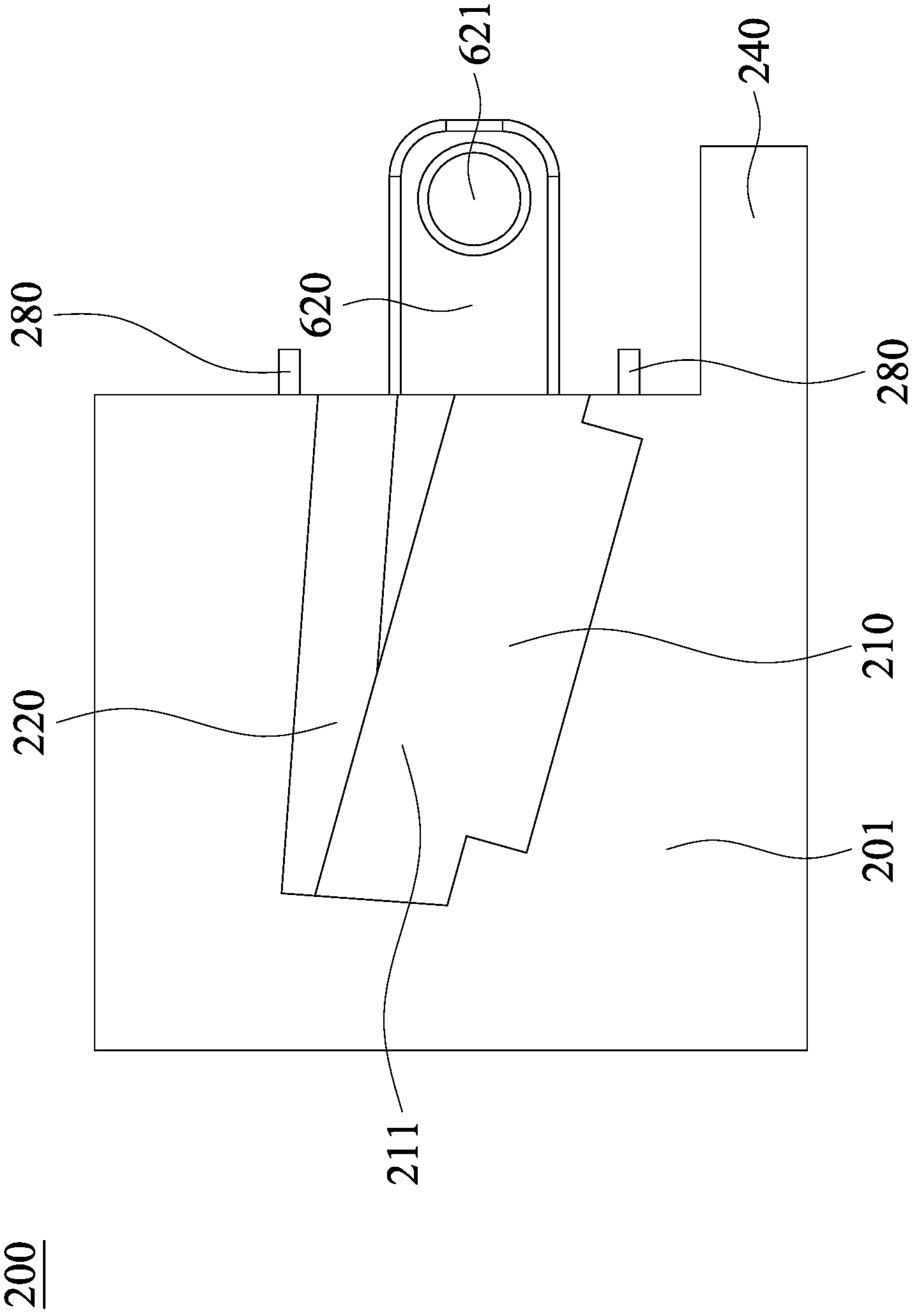

In some embodiments, the support assembly 600 may include an intermediate element 610, a first connecting element 620, and a second connecting element 630. FIG. 3A and FIG. 3B are schematic views of the fixed portion 200. The optical element 800 is movable relative to the fixed portion 200 through the support assembly 600. The intermediate element 610 may be strip-shaped and may extend along the first axis 901. The first connecting element 620 and the second connecting element 630 may be disposed on the fixed portion 200, and may have a first opening 621 and a second opening 631, respectively. The first opening 621 and the second opening 631 are used for accommodating at least a portion of the intermediate element 610. In some embodiments, the first opening 621 and the second opening 631 may have closed structures, which means they can be O-shaped instead of U-shaped, so the position of the intermediate element 610 may be defined.

In some embodiments, when viewed in a first direction that is perpendicular to the first axis 901 and the second axis 902, such as shown in FIG. 2B, the first connecting element 620 is closer to the center of the optical element 800 than the driving assembly 400, the first direction is perpendicular to the first axis 901 and the second axis 902, and the third axis 903 may be parallel to the first direction. In some embodiments, a first gap 640 may be between the first connecting element 620 and the second connecting element 630, and the center of the optical element 800 may overlap the first gap 640 when viewed in the first direction. In some embodiments, the third opening 310 of the movable portion 300 may correspond to the first connecting element 620 and the second connecting element 630, such as the first connecting element 620 and the second connecting element 630 may be disposed in the third opening 310. When viewed in the first direction, at least a portion of the first connecting element 620 and the second connecting element 630 may expose from the third opening 310.

In some embodiments, the movable portion 300 may include a first movable portion surface 321 and a second movable portion surface 322 facing the first connecting element 620 and the second connecting element 630. The first movable portion surface 321 may be perpendicular to the second axis 902, and the second movable portion surface 322 may be perpendicular to the first axis 901. In other words, the first movable portion surface 321 and the second movable portion surface 322 may be not parallel to each other, such as may be perpendicular.

In some embodiments, a distance 912 between the first movable portion surface 321 and the first connecting element 620 may be different from a distance 911 between the second movable portion surface 322 and the first connecting element 620. For example, the distance 912 may be less than the distance 911. Moreover, the first gap 640 may be less than the distance 911 and may be greater than the distance 912.

In some embodiments, as shown in FIG. 3A, the fixed portion 200 may further include a first fixed portion surface 201, a first accommodating portion 210, and a second accommodating portion 220. The first accommodating portion 210 may be used for accommodating the first coil 412, and the second accommodating portion 220 may be used for accommodating the first magnetic permeable element 411 to protect the first magnetic permeable element 411 and the first coil 412. The first accommodating portion 210 and the second accommodating portion 220 may be formed on the first fixed portion surface 201, and the depth of the second accommodating portion 220 may be less than the depth of the first accommodating portion 210 to allow the first coil 412 being accommodated in the deeper first accommodating portion 210. In some embodiments, the first accommodating portion 210 may include a first accommodating portion surface 211 facing the first coil 412, and the first accommodating portion surface 211 may be perpendicular to the first axis 901.

In some embodiments, a second gap 212 may be between the first accommodating portion 210 and the first coil 412, and a first adhesive element 270 (e.g., glue) may be disposed in the second gap 212 to allow the first coil 412 affix on the fixed portion 200. In some embodiments, the first adhesive element 270 may be in direct contact with the first accommodating portion surface 211 and at least partially in the second gap 212.

In some embodiments, the circuit assembly 700 may be disposed on the fixed portion 200 and may be electrically connected to the driving assembly 400 and the sensing assembly 500, such as may be electrically connected to the first coil 412 and the second coil 422 to provide signal to the driving assembly 400 and receive the signal detected by the sensing assembly 500 to control the driving assembly 400 by this signal.

In some embodiments, the fixed portion 200 may further include a bottom surface 230, a bottom plate 240, a first block wall 250, and a fourth opening 260. The bottom surface 230 faces the circuit assembly 700 (e.g., perpendicular to the second axis 902) and is on the bottom plate 240. The first block wall 250 may protrude from the bottom surface 230. In some embodiments, the fourth opening 260 may form on the bottom plate 240, correspond to the sensing assembly 500, and accommodate a portion of the circuit assembly 700. When viewed along the first axis 901, as shown in FIG. 2D, the bottom plate 240 and the sensing assembly 500 may at least partially overlap each other, such as the bottom plate 240 may overlap the sensing element 510. Moreover, as shown in FIG. 2C, a height 913 of the first block wall 250 may be greater than a thickness 914 of the circuit assembly 700 that is plate-shaped, so the circuit assembly 700 may be protected.

In some embodiments, as shown in FIG. 2A, a first electrical connecting portion 710 may be formed on the circuit assembly 700, and the first block wall 250 may be between the first electrical connecting portion 710 and the driving assembly 400 when viewed along the first axis 901. The first coil 412 and the second coil 422 may electrically connect to the circuit assembly 700 through the first electrical connecting portion 710 to provide control signal to the first coil 412 and the second coil 422.

In some embodiments, the fixed portion 200 may further include a stopping assembly 280 extending from the fixed portion 200 to the movable portion 300 to define the movable range of the fixed portion 200 relative to the movable portion 300.

Figure 4:
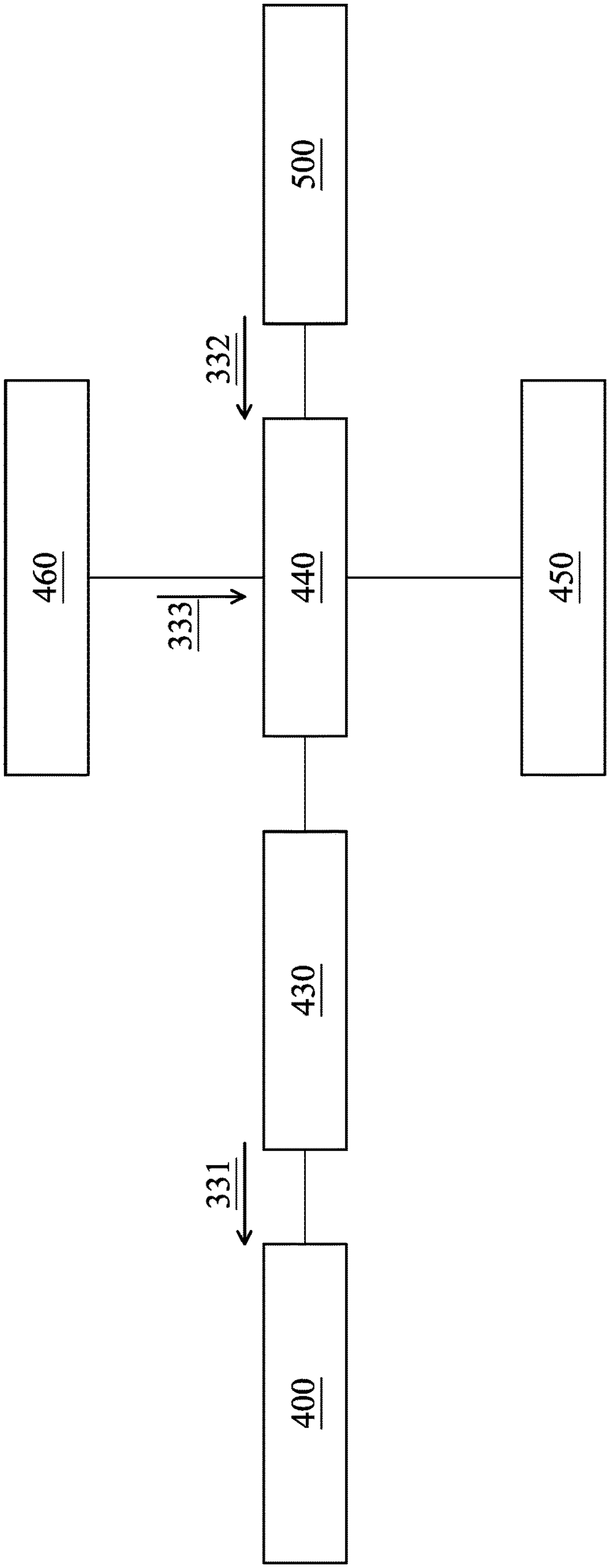
FIG. 4 is a schematic view of some elements of the optical element driving mechanism.

FIG. 4 is a schematic view of some elements of the optical element driving mechanism 100. In some embodiments, the optical element driving mechanism 100 may further include a control assembly 430, a central module 440, an optical transceiver assembly 450, and an inertia sensing assembly 460. In some embodiments, the control assembly 430 may electrically connect to the driving assembly 400 to control the driving assembly 400. The central module 440 may electrically connect to the control assembly 430, such may be a center process unit (CPU). The optical transceiver assembly 450, the inertia sensing assembly 460, and the sensing assembly 500 may electrically connect to the central module 440.

In some embodiments, the control assembly 430 may be a driver IC to control the driving assembly 400 for driving the movable portion 300 moving relative to the fixed portion 200 in a controlled range. Moreover, the stopping assembly

280 may be used for defining the movable portion 300 moving relative to the fixed portion 200 in a limited range, and the controlled range is smaller than the limited range. In other words, during normal operation situation, the control assembly 430 will control the driving assembly 400 to stop the movable portion 300 before the movable portion 300 being in contact with the stopping assembly 280 to prevent the movable portion 300 being in direct contact with the fixed portion 200, which may damage the movable portion 300.

In some embodiments, the control assembly 430 may output a first control signal 331 to the first driving portion 410 of the first control signal 331, and the control assembly 430 may include a first predetermined information 125 recording the comparison information between the first control signal 331 and the movement of the fixed portion 200 relative to the movable portion 300.

Figure 5:
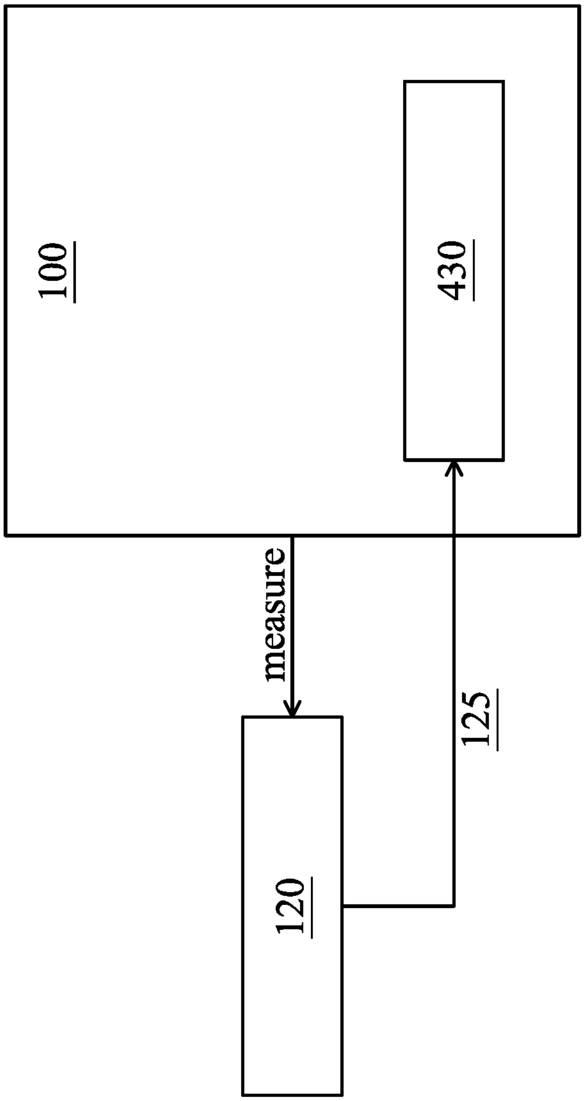
FIG. 5 is a schematic view when using the external apparatus to measure the first predetermined information.

FIG. 5 is a schematic view when using the external apparatus 120 to measure the first predetermined information 125. For example, the external apparatus 120 may measure the moving mode of the movable portion 300 relative to the fixed portion 200 in the optical element driving mechanism 100 to get the first predetermined information 125. Afterwards, the external apparatus 120 records the first predetermined information 125 into the control assembly 430.

It should be noted that the external apparatus 120 is only used during the manufacturing, and the external apparatus 120 will be removed after the first predetermined information 125 is recorded in the control assembly 430. Afterwards, the optical element driving mechanism 100 can precisely control the first driving portion 410 without the external apparatus 120.

In some embodiments, the sensing assembly 500 may input the sensing signal 332 to the central module 440, wherein the sensing signal 332 may include relation position information of the movable portion 300 relative to the fixed portion 200. It should be noted that the sensing signal 332 is not provided to the control assembly 430. In some embodiments, the inertia sensing assembly 460 may detect information related to inertia, such as acceleration, gravity direction, etc., and may input the information to the central module 440 as an inertia signal 333.

In some embodiments, the control assembly 430 may include inertia correction information recording the influence of the inertia signal 333 to the driving assembly 400. Therefore, the control assembly 430 may adjust the first control signal 331 based on the inertia correction information to correct the adverse effects of the position changes of the movable portion 300 caused by inertia (such as different gravity directions), such as offsets, changes in friction coefficients, and the like.

In some embodiments, the optical transceiver assembly 450 may be used for emitting or receiving light. In some embodiments, the central module 440 may analyze and record the sensing signal 332 and the inertia signal 333, so the times for emitting or receiving light of the optical transceiver assembly 450 may be controlled based on the sensing signal 332 and the inertia signal 333 to adjust image quality and trapezoidal deformation.

Figure 6:
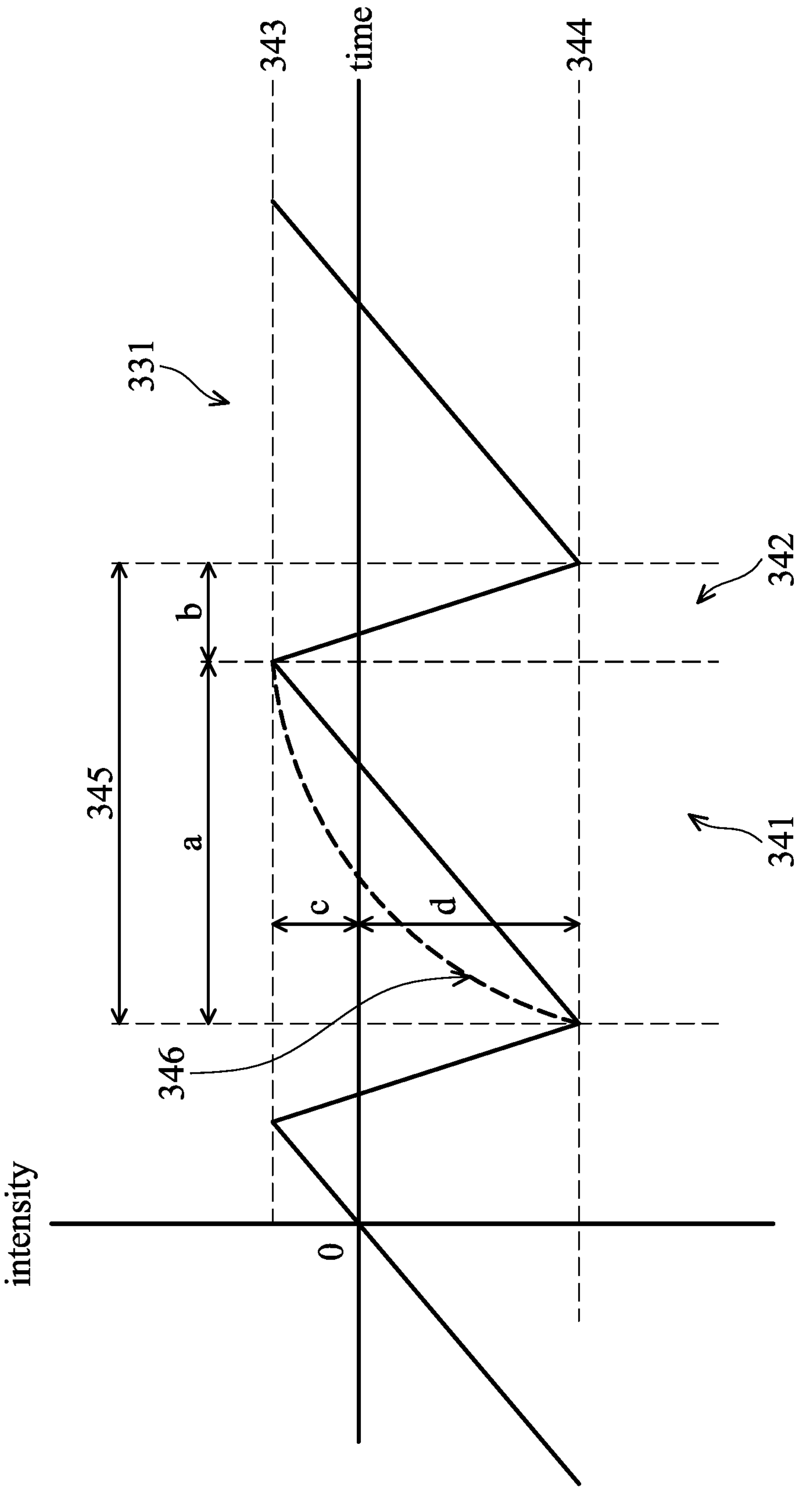
FIG. 6 is a schematic view of the first control signal in some embodiments.

FIG. 6 is a schematic view of the first control signal 331 in some embodiments. As shown in FIG. 6, the first control signal 331 may be periodic, and may include a linear first front signal 341 and a linear first rear signal 342 in a period first correction information 346. In some embodiments, the trends (e.g., slope, sign, waveform, etc.) of the first front signal 341 and the first rear signal 342 may be different. Moreover, the duration a of the first front signal 341 may be different from the duration b of the first rear signal 342, such as the duration a may be greater than the duration b.

Moreover, the first control signal 331 may include a first upper limit 343 and a first lower limit 344, wherein the first upper limit 343 and the first lower limit 344 may have opposite signs and different absolute values. For example, the first upper limit 343 may have an absolute value c, the first lower limit 344 may have an absolute value d, and the absolute value d is greater than the absolute value c. Therefore, when the first driving portion 410 is controlled by the first control signal 331, such as when the first driving portion 410 drives the movable portion 300 to rotate clockwise relative to the fixed portion 200 (go forward), a smaller driving force and a longer time a is used for driving the movable portion 300, and when the first driving portion 410 drives the movable portion 300 to rotate counterclockwise relative to the fixed portion 200 (go back), a greater driving force and a shorter time b is used for driving the movable portion 300. The movable portion 300 may be driven by an opposite mode as well.

In some embodiments, a non-linear first correction information 346 may be recorded in the control assembly 430. The first correction information 346 may include correction messages at various stages. The control assembly 430 may choose corresponding correction messages of the first correction information 346 based on requirement, and the correction information and the first control signal 331 are input into the first driving portion 410 at a same time to correct the movement of the first driving portion 410, so problems such as trapezoidal deformation when the optical element driving mechanism 100 is operating may be corrected. It should be noted that no correction is required when going back.

Figure 7A:
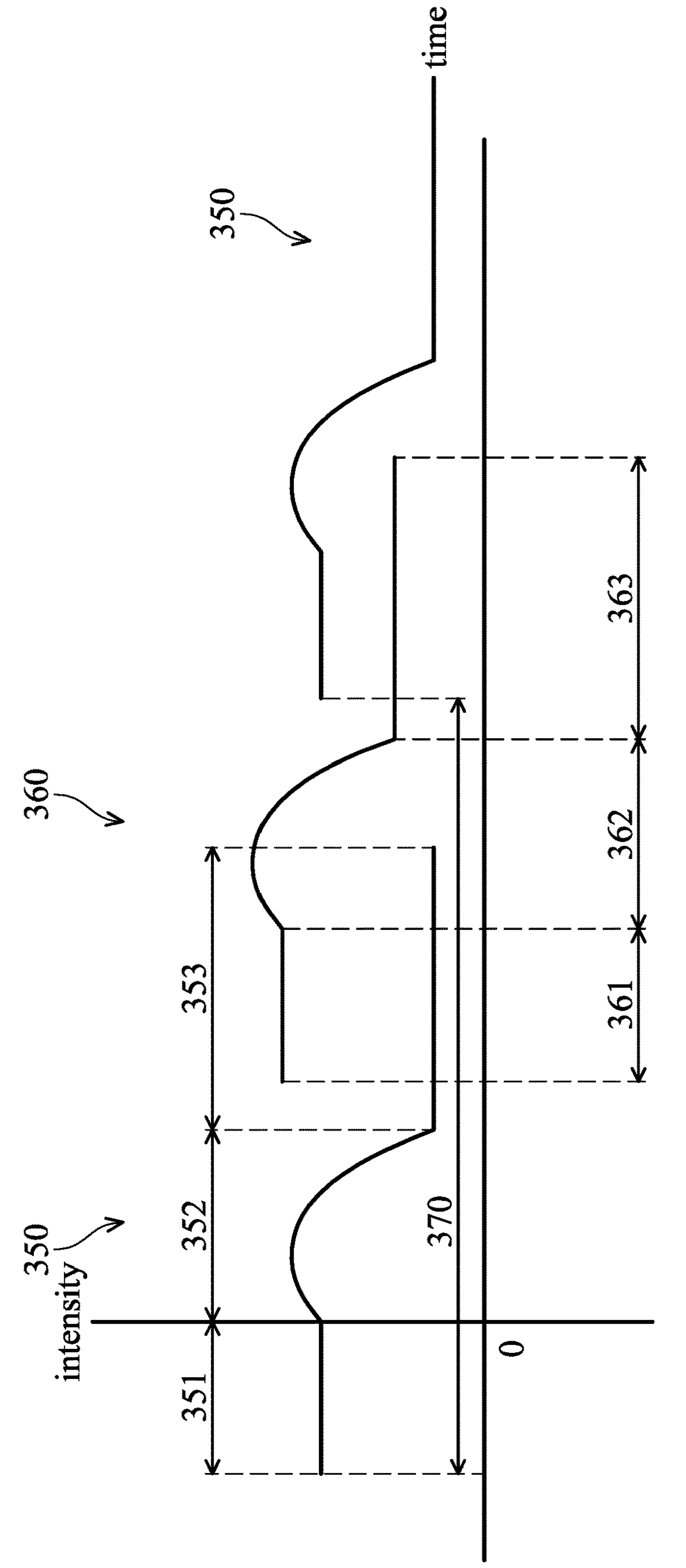
FIG. 7A is a schematic view of the control signal in some embodiments of the present disclosure.

In some embodiments, identical first control signal 331 may be used for controlling the first driving portion 410 and the second driving portion 420 at a same time, but the present disclosure is not limited thereto. For example, FIG. 7A is a schematic view of the control signal in some embodiments of the present disclosure. In this embodiment, the control assembly 430 output the first control signal 350 to control the first driving portion 410, and further output a second control signal 360 different from the first control signal 350 to control the second driving portion 420, so the first driving portion 410 and the second driving portion 420 may be driven independently. Therefore, the first driving portion 410 and the second driving portion 420 with different properties may be provided.

In some embodiments, the control assembly 430 may further include second predetermined information recording the movement correlation of second control signal 360 and the movable portion 300 relative to the fixed portion 200. Similar to FIG. 5, the external apparatus 120 may measure the movement of the movable portion 300 relative to the fixed portion 200 of the optical element driving mechanism 100 to get the second predetermined information. Afterwards, the second predetermined information is recorded to the control assembly 430 by the external apparatus 120.

After the first driving portion 410 and the second driving portion 420 respectively received the first control signal 350 and the second control signal 360, the first driving portion 410 may generate a first driving force to the movable portion 300, and the second driving portion 420 may generate a second driving force to the movable portion 300. The first driving force may drive the movable portion 300 to move in a first mode, the second driving force may drive the movable portion 300 to move in a second mode, and the first mode and the second mode are in an identical dimension with opposite directions, such as clockwise and counterclockwise.

In some embodiments, the first control signal 350 and the second control signal 360 may be periodic. In a period 370, the first control signal 350 may include a first front signal 351, a first middle signal 352, and a first rear signal 353. The trends of the first front signal 351 (e.g., slope, sign, or shape), the first middle signal 352, and the first rear signal 353 are different. Moreover, In a period, the second control signal 360 may include a second front signal 361, a second middle signal 362, and a second rear signal 363. The trends of the second front signal 361 (e.g. slope, sign, or shape), the second middle signal 362, and the second rear signal 363 are different.

For example, the first front signal 351 and the second front signal 361 may be linear signals, such as having constant intensity. Afterwards, the first middle signal 352 and the second middle signal 362 may be non-linear signals, such as may gradually increase the intensity and then reduce the intensity until the intensity is less than the intensity of the first front signal 351 (or the second front signal 361). In some embodiments, the first rear signal 353 and the second rear signal 363 may be linear signals, such as having constant intensity.

It should be noted that the averages of the first front signal 351 and the first rear signal 353 may be different, such as the average of the first front signal 351 may be greater than the average of the first rear signal 353. Moreover, the averages of the second front signal 361 and the second rear signal 363 may be different, such as the average of the second front signal 361 may be greater than the average of the second rear signal 363. In some embodiments, the average of the second front signal 361 may be greater than the averages of the first front signal 351 and the first rear signal 353.

In some embodiments, the first control signal 350 may be output to the first driving portion 410 and the second control signal 360 may be output to the second driving portion 420 in an overlap period, such as the first rear signal 353 may be output to the first driving portion 410, and the second front signal 361 may be output to the second driving portion 420 at a same period, so the first driving portion 410 and the second driving portion 420 may be controlled in a same period.

In some embodiments, the control assembly 430 may further include integrated predetermined information recording the movement correlation of the first control signal 350 and the second control signal 360 and the movable portion 300 relative to the fixed portion 200, so the control assembly 430 may determine the time providing the first control signal 350 and the second control signal 360 to the first driving portion 410 and the second driving portion 420 based on the integrated predetermined information. Therefore, the first driving portion 410 and the second driving portion 420 may be controlled more precisely.

Figure 7B:
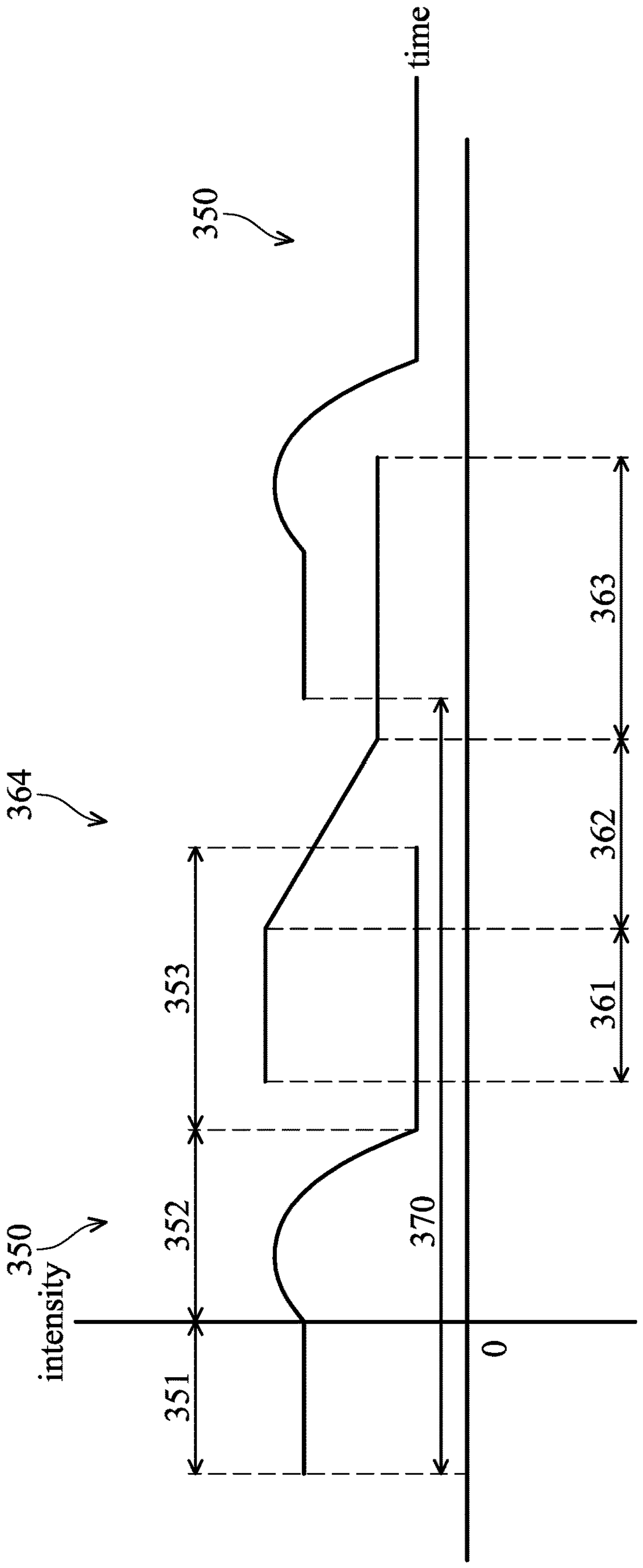
FIG. 7B and FIG. 7C are schematic views of the control signals in some embodiments of the present disclosure.
Figure 7C:
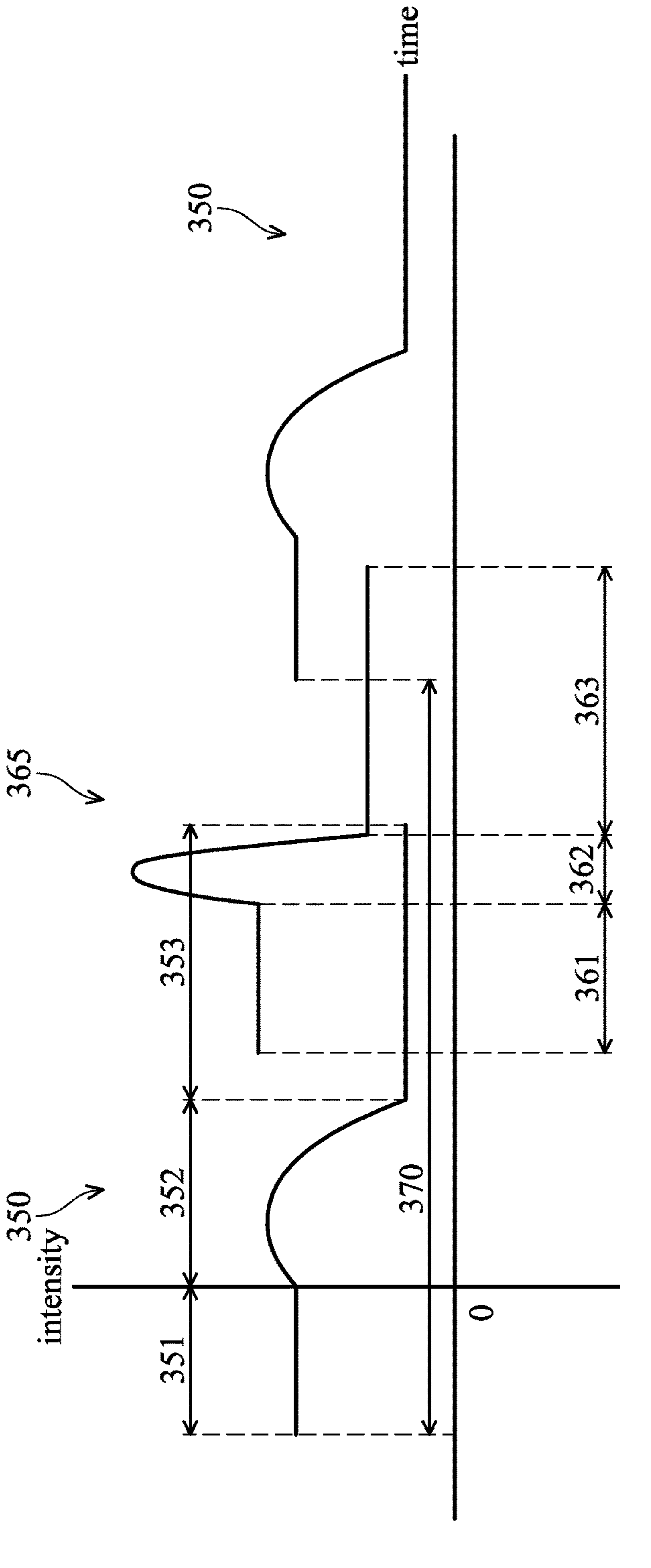

In some embodiments, control signals with different forms may be used. For example, FIG. 7B and FIG. 7C are schematic views of the control signals in some embodiments of the present disclosure, wherein the second middle signal 362 of the second control signal 364 in FIG. 7B may be linear, and the second middle signal 362 of the second control signal 365 in FIG. 7C may have a higher intensity than the second middle signal 362 in FIG. 7A.

In summary, a method for controlling an optical element driving mechanism is provided. The method includes controlling a driving assembly to drive a movable portion moving relative to a fixed portion. The movable portion is used for connecting to an optical element, and the movable portion is movable relative to the fixed portion. Therefore, functions like detection, scanning, and projection may be achieved, and miniaturization may be achieved as well.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. A method for controlling an optical element driving mechanism, comprising:

controlling a driving assembly by a driver integrated circuit (IC) electrically connected to the driving assembly to drive a movable portion moving relative to a fixed portion, wherein the driving assembly comprises a first driving portion disposed on one side of the fixed portion and the movable portion, the first driving portion comprises a first magnetic permeable element, a first coil, and a first magnetic element, the second driving portion comprises a second magnetic permeable element, a second coil, and a second magnetic element, wherein the first coil surrounds the first magnetic permeable element, the first magnetic element is disposed between two extending portions of the first magnetic permeable element, the second coil surrounds the second magnetic permeable element, and the second magnetic element is disposed between two extending portions of the second magnetic permeable element;

outputting a first control signal to the first driving portion by the driver IC, wherein the first control signal is periodic and comprises a first front signal and a first rear signal in a period, trends of the first front signal and the first rear signal are different, and durations of the first front signal and the first rear signal are different;

sensing movement of the movable portion relative to the fixed portion by a sensing assembly electrically connected to the driving assembly, wherein the sensing assembly comprises a sensing element disposed on the fixed portion, a second reference element disposed on the movable portion, and a balance element disposed on the movable portion, wherein the sensing element overlaps the second reference element in a first direction, and the second reference element and the balance element are disposed on opposite sides of the movable portion along the first direction;

providing a central process unit electrically connected to the driver IC;

outputting a sensing signal to the central process unit by the sensing assembly; and analyzing and recording the sensing signal by the central process unit, wherein the sensing signal is not outputted to the driver IC, wherein the movable portion is used for connecting an optical element, and the movable portion is movable relative to the fixed portion.

2. The method as claimed in claim 1, further comprising:

limiting the movable portion to move relative to the fixed portion in a limited range by a stopping protrusion extending from a surface of the fixed portion, wherein the surface faces the movable portion;

wherein the driving assembly is controlled by the driver IC to drive the movable portion moving relative to the fixed portion in a controlled range;

wherein the controlled range is smaller than the limited range.

3. The method as claimed in claim 2, further comprising:

measuring the movement of the movable portion relative to the fixed portion;

recording a movement correlation of the movable portion relative to the fixed portion and the first control signal as a first predetermined information; and recording the first predetermined information in the driver IC.

4. The method as claimed in claim 3, further comprising:

recording the inertia correction information in the driver IC; and driving the movable portion to rotate relative to the fixed portion by the driving assembly relative to a rotational axis, and the rotational axis does not pass through a center of mass of the movable portion.

5. The method as claimed in claim 4, wherein the first control signal has a first upper limit and a first lower limit, the first upper limit and the first lower limit have negative signs and different absolute values.

6. The method as claimed in claim 5, further comprising recording a first correction information in the driver IC, wherein the first correction information comprises correction message in different steps.

7. The method as claimed in claim 6, further comprising choosing the first control signal and the corresponding correction message in the first correction information by the driver IC based on requirement, and outputting the first control signal and the correction message to the first driving portion at a same time.

8. The method as claimed in claim 7, further comprising:

adjusting the first control signal by the driver IC based on the inertia correction information to correct a position change of the movable portion caused by inertia;

wherein the position change comprises offsets and changes in friction coefficients.

9. The method as claimed in claim 8, wherein:

the first correction information only corresponds to the first front signal, without corresponding to the first rear signal;

the first front signal is linear; and the first correction information is not linear.

10. The method as claimed in claim 3, further comprising:

outputting a second control signal by the driver IC to a second driving portion of the driving assembly;

recording the movement correlation of the movable portion relative to the fixed portion and the second control signal as a second predetermined information; and recording the second predetermined information in the driver IC.

11. The method as claimed in claim 10, further comprising:

measuring movement of the movable portion relative to the fixed portion to get the second predetermined information;

wherein the first driving portion generates a first driving force, the second driving portion generates a second driving force, the first driving force drives the movable portion in a first mode, the second driving force drives the movable portion in a second mode, and the first mode and the second mode have an identical dimension and different directions.

12. The method as claimed in claim 11, further comprising:

recording the movement correlation of the movable portion relative to the fixed portion, the first control signal, and the second control signal as an integrated predetermined information; and recording the integrated predetermined information in the driver IC.

13. The method as claimed in claim 12, wherein:

the first control signal further comprises a first middle signal, and trends of the first front signal, the first middle signal, and the first rear signal are different; and averages of the first front signal and the first rear signal are different.

14. The method as claimed in claim 13, wherein:

the average intensity of the first front signal is greater than the average intensity of the first rear signal; and the second control signal is periodic and has a second front signal, a second middle signal, and a second rear signal, and trends of the second front signal, the second middle signal, and the second rear signal are different.

15. The method as claimed in claim 14, wherein:

the first front signal is linear;

the first middle signal is non-linear;

the first rear signal is linear; and the method further comprises outputting the second control signal to the second driving portion when the first control signal is output to the first driving portion.

16. The method as claimed in claim 15, further comprising:

outputting the second front signal to the second driving portion when the first rear signal is output to the first driving portion; and determining the time of outputting the first control signal and the second control signal by the driver IC based on the integrated predetermined information.

17. The method as claimed in claim 16, wherein:

the average intensity of the second front signal is greater than the average intensity of the first rear signal; and the average intensity of the second front signal is greater than the average intensity of the first front signal.

* * * * *